Oct. 15, 1963  R. J. COSTANZO  3,107,328
SATURABLE REACTOR DIMMER
Filed Aug. 4, 1959

INVENTOR
Raphael J. Costanzo
BY
Wooster, Davis & Cifelli
ATTORNEYS 3,107,328
SATURABLE REACTOR DIMMER
Raphael J. Costanzo, Bridgeport, Conn., assignor to Harvey Hubbell, Incorporated, Bridgeport, Conn., a corporation of Connecticut
Filed Aug. 4, 1959, Ser. No. 831,650
4 Claims. (Cl. 323—88)

This invention relates to a saturable reactor control for a load or consumption circuit, such, for example, as a control for changing the voltage and current of an electric light circuit supplied with current from an alternating current source, to thus control the light intensity or dim it as desired.

It is an object of the invention to provide a simple and effective control for such or a similar load circuit, comprising a secondary or control circuit in which there are no batteries or other external source of current supply in the control circuit.

It is also an object to provide an arrangement by which a large load may be controlled with a control circuit requiring only a small current and using low capacity units, and in which the control means for adjusting the value of the current in the control circuit, such, for example, as a low capacity potentiometer, may be located in a remote area at a distance from the load or primary circuit to be controlled.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 1:
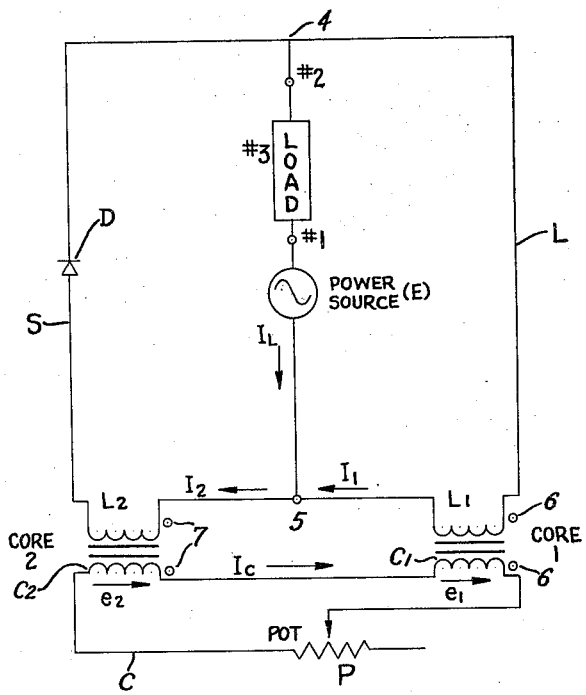
FIG. 1 is a schematic diagram of the circuits involving this invention.

Referring to FIG. 1, a load is indicated at 3, which may be of any suitable type, such, for example, as standard electric lights, although this control device is not limited to such loads but may be used with other types of loads, such, for example, as infra-red devices, heating means, fluorescent lighting, and so forth. Two similar reactors are designated as core 1 and core 2, and these are preferably toroid type reactors, as they have been found to be more efficient and more effective and adapted for use in this device. It has been found that toroids employing silicon grain-oriented steel cores are most effective in this control. These comprise a band of silicon grain-oriented steel about .012 inch thick of hydrogen annealed iron, which treatment forms an oxide coating which electrically insulates superimposed convolutions.

Each reactor has a primary winding, the two being indicated as L1 and L2, and a control or secondary winding C1 and C2. In the load circuit L is a power source E of alternating current. In this shunt circuit S and in series with the winding L2 is a rectifier or single diode D which blocks reverse current in the winding L2. A silicon type diode is preferred because of its smaller size for a given capacity, thus requiring less space in the installation. The load 3 and the source of alternating current E are connected in series with the winding L1 in the load circuit L, and as the circuit S is connected to this circuit on opposite sides of the load and the power source, the winding L2, the diode D, the load and the power source E are also connected in series in the circuit S. This arrangement also places the two windings L1 and L2 in a circuit in series with the diode D across which the load and the alternating current source are connected in series at the point 4 between the diode and winding L1 and at the point 5 between the two windings L1 and L2. The secondary windings C1 and C2 are connected in a secondary or control circuit C in series with means for controlling or varying the value of the current in the control circuit, such, for example, as a variable resistance in the form of a potentiometer P. Currents IL, I1, I2 and IC in the various circuits are indicated with arrows showing their direction assumed as "positive." It is to be noted that I2 cannot be negative because of the diode D. Polarity dots 6 and 7 show the "start" of each winding. Voltages in the secondary or control windings C1 and C2 are indicated by the arrows $e1$ and $e2$.

Figure 2:
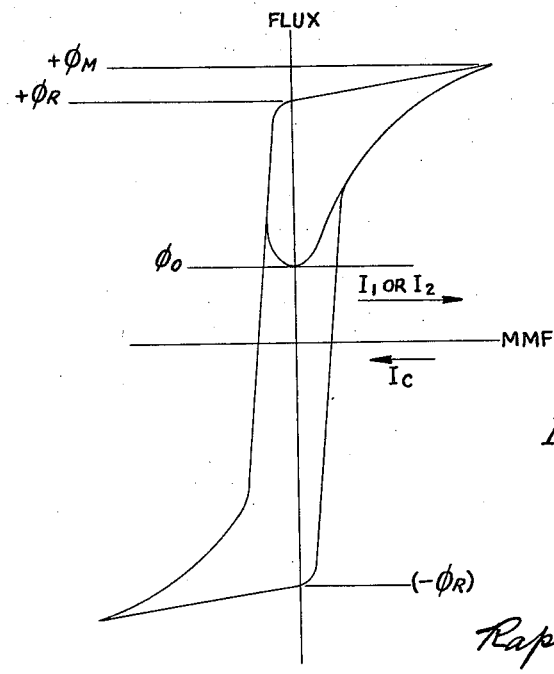
FIG. 2 is a typical hysteresis loop indicating action of the windings.

In the hysteresis loop diagram of FIG. 2, $\phi M$ is the peak flux, $\phi R$ is the residual flux, and $\phi 0$ is the flux level resulting from the "reset," which could be caused by positive control current IC in the control circuit, or by negative load current.

When the flux changes in either core due to positive load current, a voltage $e1$ or $e2$ is induced in the secondary windings in the direction shown by the arrows. When flux changes are caused by positive control current, the resulting induced voltages are in the opposite direction.

The A.C. supply voltage E from the power source is assumed to be a sine wave. The half cycle during which point 2 is at higher potential than the point 1 will be the "positive" half cycle of voltage. This would be the half cycle during which the current I2 can be made to flow due to the unidirectional action of the diode D. If now we consider the instant when the current I is a maximum, at this time the reactor 2 has a very low drop or impedance, its flux being maximum at $\phi M$ and the core being essentially saturated. As the supply voltage drops toward zero, the current also decreases, the flux drops from $\phi M$ toward $\phi R$, and reaches this point when the current reaches zero. This flux change induces a slight negative $e2$ in secondary winding C2 and provides a slight voltage tending to maintain primary current I2 momentarily after the supply voltage E reaches zero.

As supply voltage E goes negative (that is, point 1 at higher potential than point 2) conditions arise to cause a positive current I1 in the load circuit L. If core 1 is at this time below saturation, this current will cause the flux to rise, inducing a positive $e1$ in the secondary winding C1 and causing a positive current IC in the secondary or control circuit C. This current flowing in the control winding C2 on core 2 causes a decrease in the flux in that core and produces a counter —E.M.F. in winding C2 which is a negative $e2$. The magnitude of the current IC in the control circuit depends on the instantaneous sum of $e1$ and $e2$ (considering sign) divided by the resistance in the circuit. Since the hysteresis loop of the grain-oriented silicon steel is quite narrow, a small current IC in the control circuit can cause a great flux change. Tests show that the inverse voltage appearing in the diode D is low, indicating that the counter E.M.F. of primary winding L2 is essentially the same as that of primary winding L1. This means that the total flux change on each of the two cores (up in core 1 and down in core 2) is the same.

After core 1 has "fired" and provided a fairly heavy load current during the remainder of the "negative" half cycle, it returns to the residual flux condition as the load current I1 drops to zero. The slight negative current $e1$ in the secondary winding C1 during the flux drop causes a slight negative current IC in the control circuit which, flowing in the control winding C2 on core 2, gives a starting "boost" to the flux in core 2. If core 2 is below saturation, say at point $\phi 0$ in FIG. 2, due to the positive control current IC mentioned above, then when current I2 starts to flow in circuit S as the positive half cycle begins, the flux in core 2 rises, a positive current $e2$ is induced in control winding C2 causing a positive current IC in the control circuit which drives the flux in core 1 down, reaching $\phi 0$ in that core at the time core 2 "fires." After that "firing" the impedance of winding L2 is much lower than that of winding L1, and virtually no current I1 can flow in the load circuit.

Thus it is seen that with a single diode and with the cores (of good magnetic material such, for example, as that indicated above used in toroids) closely coupled by the passive control circuit, current flows in winding L2 during the positive half cycle of supply voltage and in winding L1 during the negative half cycle. In either case, the load voltage is low (near zero) during the cut off period, rises rapidly when each reactor "fires," and thereafter closely follows the sine wave of the applied voltage until the end of that half cycle. With this control, A.C. current supply E of 120 volts, for example, can be controlled to supply a range of voltage from 0 to 115 volts on the load 3.

In use or operation, as resistance at the potentiometer is reduced, the voltage will be increased in the secondary or control circuit C. This increases saturation in the cores (reduces impedance) and increases the voltage in the primary or load circuit, thus increasing the voltage across the load. If the resistance at the potentiometer is increased, just the opposite effect is secured, and a decrease in voltage is applied across the load.

It will be seen that in this control the secondary or control winding is on the same core, and independent of the primary or load circuit winding; also that the control means or means for adjusting the value of the resistance and therefore the current in the control circuit, such, for example, as the potentiometer P, may be located in a remote area and at practically any desired distance from the load or primary circuit to be controlled. The use of a single diode (a silicon diode is preferred as it has a greater efficiency for the required space) plus this type of circuit can be used for controlling both incandescent and fluorescent lighting equipment without auxiliary units. It is, however, not confined to use for this type of load, but it may be used for controlling any load operated from an A.C. current supply source. It will be noted that there is no battery or external source of current supply required in the secondary or control circuit. This control can control large loads with a small control circuit current. Thus the secondary or control circuit can be constructed of low capacity units. For example, a small capacity potentiometer can be used for controlling a relatively large load circuit.

Having thus set forth the nature of my invention, I claim:

1. The combination of a source of alternating current, a load to be controlled, a reactor core, a primary winding on said core, a circuit connecting said source, load and winding in series, a second reactor core, a primary winding on said second reactor core, a diode, a second circuit connecting the diode and the second primary winding in series with the load and alternating current source, said circuits so connected the primary windings are in series with each other and the diode a secondary winding on each of the cores wound in the same sense, a potentiometer, and a control circuit comprising the secondary windings and potentiometer connected in series.

2. The combination of a source of alternating current, a load to be controlled, first and second reactor cores, primary and secondary windings on each core, a circuit connecting the source, load and first reactor primary winding in series, a half wave rectifier, a second circuit connecting the source, load, second reactor primary winding and rectifier in series, a control circuit connecting the secondary windings in series, and an adjustable control resistance in the control circuit.

3. The combination of a source of alternating current, a load to be controlled, first and second reactor cores, primary and secondary windings on each core, a diode, a circuit connecting the primary windings and the diode in series, a second circuit connecting the load and current source in series across the first circuit at a point between the two windings and a point between the diode and the first winding, a control circuit connecting the two secondary windings in series, and a control potentiometer in the latter circuit.

4. The combination of a source of alternating current, a load to be controlled, first and second toroid reactors each including a primary and a secondary winding, a rectifier, a circuit connecting the current source, the load and the first primary winding in series, a second circuit in parallel with the first circuit and connecting the current source and the load in series with the rectifier and the second primary winding, a control circuit connecting the secondary windings in series, and an adjustable control means for adjusting the value of the resistance of the latter circuit.

References Cited in the file of this patent
UNITED STATES PATENTS

| | | |
|---|---|---|
| 2,745,055 | Woerdemann | May 8, 1956 |
| 2,800,626 | Bastian | July 23, 1957 |
| 2,892,148 | Large et al. | June 23, 1959 |
| 2,960,646 | Malsbary | Nov. 15, 1960 |
| 2,972,059 | Bonn et al. | Feb. 14, 1961 |